(12) United States Patent
Bruestle

(10) Patent No.: US 10,060,397 B2
(45) Date of Patent: Aug. 28, 2018

(54) INTAKE UNIT COMPRISING INTEGRATED CHARGE AIR COOLER

(71) Applicant: Neander Motors AG, Kiel (DE)

(72) Inventor: Claus Bruestle, Nordheim (DE)

(73) Assignee: Neander Motors AG, Kiel (DE)

( * ) Notice: Subject to any disclaimer, the term of this patent is extended or adjusted under 35 U.S.C. 154(b) by 47 days.

(21) Appl. No.: 15/133,279

(22) Filed: Apr. 20, 2016

(65) Prior Publication Data

US 2016/0312748 A1    Oct. 27, 2016

(30) Foreign Application Priority Data

Apr. 21, 2015  (DE) .................... 10 2015 005 047

(51) Int. Cl.
*F02B 29/04*    (2006.01)
*F02B 33/00*    (2006.01)
(Continued)

(52) U.S. Cl.
CPC ... *F02M 35/10268* (2013.01); *F02B 29/0462* (2013.01); *F02B 29/0475* (2013.01);
(Continued)

(58) Field of Classification Search
CPC ....... F02M 35/10268; F02M 35/10144; F02M 35/10157; F02M 35/10137; F02M 35/167;
(Continued)

(56) References Cited

U.S. PATENT DOCUMENTS 2,346,463 A * 4/1944 Szekely .................. F02B 25/00
123/563
3,881,455 A * 5/1975 Belsanti .............. F02B 29/0462
123/563
(Continued)

FOREIGN PATENT DOCUMENTS

DE          10332989 A1 *  4/2004 .......... F02B 29/0456
DE   10 2008 014 168 A1    9/2008
(Continued)

OTHER PUBLICATIONS

German Office Action issued in counterpart German Application No. 10 2015 002 047.8 dated Feb. 2, 2016 (five (5) pages).
(Continued)

*Primary Examiner* — Thai Ba Trieu
(74) *Attorney, Agent, or Firm* — Crowell & Moring LLP

(57) ABSTRACT

An outboard turbocharged internal combustion engine includes an outboard engine housing. An exhaust gas turbocharger has a turbine and a charger disposed on the outboard engine housing. A charge air cooler is integrated in an intake unit. The intake unit is routed via connecting ducts and includes a unit container having first, second, and third container sections. The first container section is connected to the second container section accommodating the charge air cooler. The second container section is connected to the third container section that carries air to the charge air cooler. The third container section is formed of a tubular body tapering downward from the second container section toward the charger of the exhaust gas turbocharger. The first container section, the second container section, and the third container section are combined as an integral unit forming an intake unit module composed of a light alloy.

10 Claims, 3 Drawing Sheets

(51) Int. Cl.
| | |
|---|---|
| *F02M 35/16* | (2006.01) |
| *F02M 35/10* | (2006.01) |
| *F02B 61/04* | (2006.01) |
| *F02B 75/06* | (2006.01) |
| *F02B 37/00* | (2006.01) |
| *F28F 9/02* | (2006.01) |
| *F28D 7/16* | (2006.01) |
| *F28F 1/32* | (2006.01) |
| *F28D 21/00* | (2006.01) |

(52) U.S. Cl.
CPC ............ *F02B 37/00* (2013.01); *F02B 61/045* (2013.01); *F02B 75/065* (2013.01); *F02M 35/10144* (2013.01); *F02M 35/10157* (2013.01); *F02M 35/10327* (2013.01); *F02M 35/167* (2013.01); *F28D 7/16* (2013.01); *F28D 2021/0082* (2013.01); *F28F 1/32* (2013.01); *F28F 9/0263* (2013.01); *Y02T 10/144* (2013.01); *Y02T 10/146* (2013.01)

(58) Field of Classification Search
CPC .. F02B 29/0462; F02B 29/0475; F02B 37/00; F02B 61/045; F02B 75/065; F02B 19/04; F28D 7/16; F28D 2021/0082; F28F 1/32; F28F 9/0263; Y02T 10/144; Y02T 10/146
USPC ............ 60/599; 123/563–565; 440/88 A, 75
See application file for complete search history.

(56) References Cited

U.S. PATENT DOCUMENTS

| | | | | |
|---|---|---|---|---|
| 3,976,041 | A * | 8/1976 | Mettig | ................ F02B 29/0475 123/563 |
| 4,269,158 | A * | 5/1981 | Berti | ................... F02B 29/0475 123/563 |
| 4,311,009 | A * | 1/1982 | Elsbett | ................. F02B 37/025 60/605.1 |
| 4,827,722 | A | 5/1989 | Torigai | |
| 4,986,349 | A * | 1/1991 | Ono | ........................ F28D 7/103 165/154 |
| 6,422,221 | B2 * | 7/2002 | Pietrowski | ............. F02B 75/22 123/184.61 |
| 7,077,113 | B2 * | 7/2006 | Bilek | .................. F02B 29/0462 123/563 |
| 8,677,982 | B2 * | 3/2014 | Marimbordes | ..... F02B 29/0475 123/563 |
| 8,905,008 | B2 * | 12/2014 | Leroux | ............... F02B 29/0475 123/188.14 |
| 9,562,467 | B2 * | 2/2017 | Watanabe | ........ F02M 35/10262 |
| 2004/0206340 | A1 | 10/2004 | Bilek et al. | |
| 2008/0087402 | A1 * | 4/2008 | Burk | ................... F02B 29/0443 165/101 |
| 2010/0040465 | A1 * | 2/2010 | Moran | ................ F01N 13/1816 415/213.1 |
| 2010/0077996 | A1 | 4/2010 | Pantow et al. | |
| 2010/0089342 | A1 * | 4/2010 | Wegner | ............... F02B 29/0475 123/563 |
| 2011/0195620 | A1 * | 8/2011 | Davis | .................... B63H 20/14 440/75 |
| 2013/0220289 | A1 | 8/2013 | Maceroni et al. | |
| 2013/0276763 | A1 | 10/2013 | Eilemann et al. | |
| 2014/0041385 | A1 | 2/2014 | Wittwer | |
| 2014/0326215 | A1 * | 11/2014 | Haefner | ........... F02M 35/10078 123/563 |
| 2014/0326222 | A1 | 11/2014 | Hummel et al. | |
| 2015/0075750 | A1 | 3/2015 | Bruggesser et al. | |
| 2015/0292451 | A1 * | 10/2015 | Jacques | ........... F02M 35/10268 123/542 |
| 2015/0367924 | A1 * | 12/2015 | Davis | ................... B63H 20/002 440/53 |
| 2016/0186651 | A1 * | 6/2016 | Elflein | ............. F02M 35/10268 123/540 |
| 2017/0016685 | A1 * | 1/2017 | Hohmann | ........... F02B 29/0475 |
| 2017/0114737 | A1 * | 4/2017 | Bruestle | ........... F02M 35/10222 |

FOREIGN PATENT DOCUMENTS

| | | |
|---|---|---|
| DE | 10 2010 063 324 A1 | 6/2012 |
| DE | 10 2012 000 875 A1 | 7/2013 |
| DE | 10 2012 204 121 A1 | 9/2013 |
| DE | 10 2012 204 211 A1 | 9/2013 |
| DE | 10 2012 015 907 B3 | 10/2013 |
| EP | 0 380 883 A1 | 8/1990 |
| EP | 2 532 855 A2 | 12/2012 |
| EP | 2 696 054 A1 | 2/2014 |
| JP | 2003-106228 A | 4/2003 |
| WO | WO 2009/003562 A1 | 1/2009 |

OTHER PUBLICATIONS

German-language European Search Report issued in counterpart European Application No. 16000671.4 dated Sep. 27, 2016 with partial English translation (seven pages).

German Office Communication issued in counterpart German Application No. 10 2015 005 047.8 dated Jun. 17, 2015 (three (3) pages).

* cited by examiner

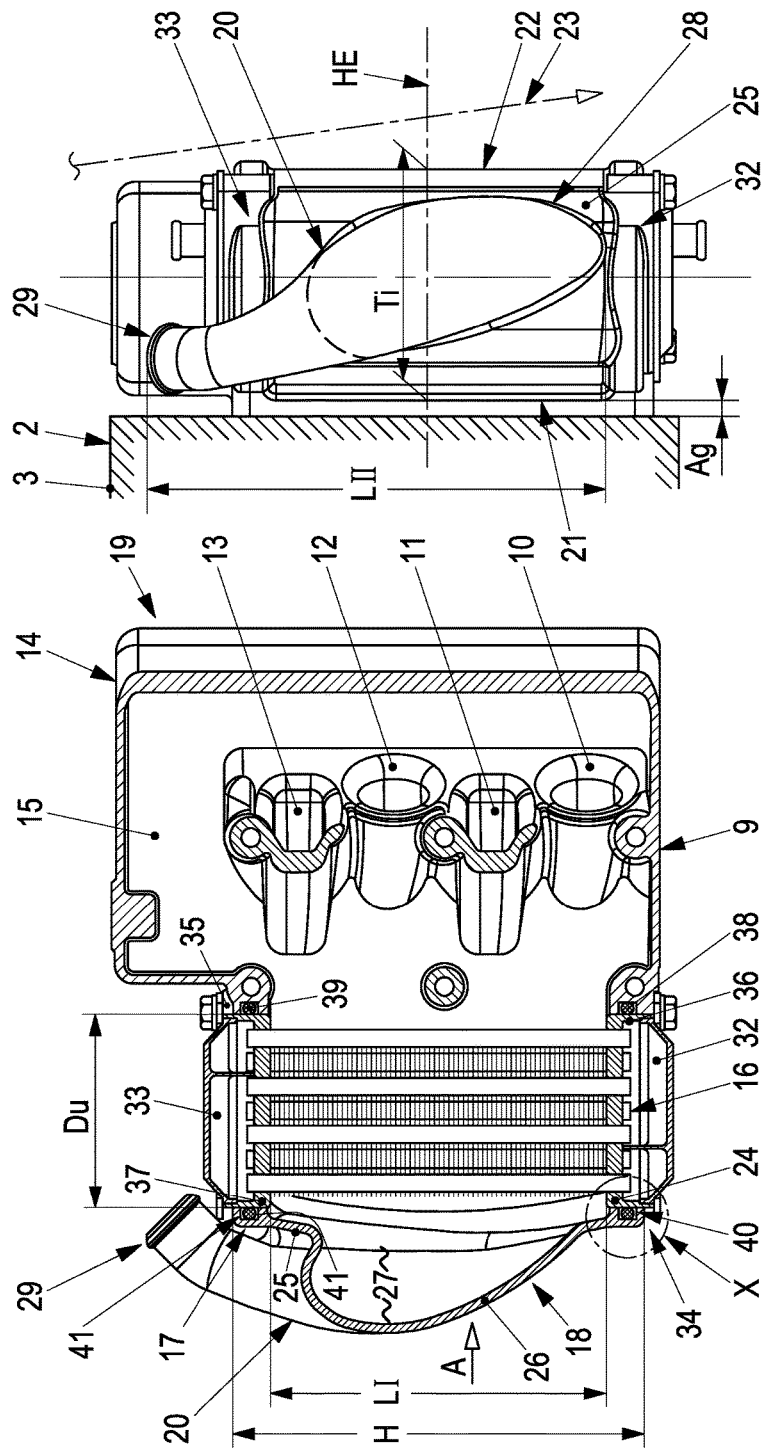

INTAKE UNIT COMPRISING INTEGRATED CHARGE AIR COOLER

CROSS REFERENCE TO RELATED APPLICATION

This application claims priority under 35 U.S.C. § 119 from German Patent Application No. 10 2015 005 047.8, filed Apr. 21, 2015, the entire disclosure of which is herein expressly incorporated by reference.

BACKGROUND AND SUMMARY OF THE INVENTION

The invention relates to an intake unit comprising an integrated charge air cooler for an internal combustion engine of reciprocating piston design, the engine being provided with an exhaust gas turbocharger.

EP 2 532 855 A2 discloses a heat exchanger that is attached to a housing carrying intake air, preferably an intake module. The internal combustion engine comprises a first and second coolant box, between which a finned tube block extends, wherein the tubes of the finned tube block each terminate in a base, and in each case a base is connected in sealed fashion to the respective coolant box. The first and second coolant boxes support the heat exchanger on a housing carrying the intake air, to which housing the intake module of the internal combustion engine is attached.

DE 10 2010 063 324 A1 describes a device for cooling charge air of an internal combustion engine. This device includes a plurality of second cooling tubes to transport a second coolant, wherein the first cooling tubes run along the longitudinal axis of extension of the device. A plurality of the first cooling tubes is also disposed in a perpendicular axis of extension relative to the plurality of the second coolants.

DE 10 2012 204 211 A1 discloses a charge air device for an internal combustion engine that includes a housing with a charge air cooler disposed therein. The housing, composed of plastic, includes multiple housing sections—specifically, a first housing section comprising charge air tubes, a second housing section to accommodate the charge air cooler, and a third housing section to supply air to the charge air cooler. The constructive design of the housing sections of the charge air device produces a substantial spatial expansion that conflicts with a compact configuration of said charge air cooler in an internal combustion engine having restricted installation space.

In EP 2 696 054 A1, an outboard motor in the form of an internal combustion engine comprises a machine housing having a cylinder head and a cylinder housing in which two vertical crankshafts of a crankshaft system are disposed. The crankshafts are operated through connecting rods by reciprocating pistons moving inside cylinders. The internal combustion engine is provided with a turbocharger that is attached to the top front wall of the machine housing, thereby optimizing performance and fuel consumption efficiency.

The object of the invention is to design an internal combustion engine comprising an intake unit with integrated charge air cooler that uses a specific geometric and effective constructive design, enabling the engine to be attached to an engine housing of the internal combustion engine with a minimum space requirement and that can be easily implemented. The invention must also ensure that the radiated heat from the internal combustion engine can be readily taken up by a unit container of defined strength.

This object is achieved according to the invention by an intake unit comprising an integrated charge air cooler for an internal combustion engine of the reciprocating piston design that is provided with an exhaust gas turbocharger and comprises, e.g., two cylinders accommodating reciprocating pistons, said cylinders being part of an engine housing including a cylinder housing and a cylinder head that includes two inlet ducts, to which inlet ducts the intake unit is routed by connecting ducts. The intake unit including a unit container has a first container section comprising connecting ducts, which first container section is connected to a second container section accommodating the charge air cooler, which second container section is connected to a third container section carrying the air to the charge air cooler. The internal combustion engine is in the form of an outboard engine and the engine housing includes a vertical crankshaft system and horizontal cylinders, wherein the exhaust gas turbocharger created by a turbine and a charger is disposed on a top front side of the engine housing. The first container section, the second container section, and the third container section are combined as one integrated piece to form an intake unit module composed of a light alloy, which third container section is created as a tubular body that tapers down from the second container toward the charger.

The advantages achieved by the invention are seen in the fact that the intake unit including an integrated charge air cooler can be advantageously integrated in an internal combustion engine of reciprocating piston design operating as an outboard engine, i.e., the advantages being in terms of a geometric and functional configuration or package. This is supported by the construction of the internal combustion engine that has two horizontal cylinders accommodating the reciprocating pistons. These cylinders are part of an engine housing comprising a cylinder housing and a cylinder head including inlet ducts, to which inlet ducts the intake unit is routed by connecting ducts. The intake unit, which is easy to design and provided with a unit container, exhibits an ingenious solution, which intake container is combined with the first container section supporting the connecting ducts. The first container section is connected, setting a pattern, to the second container section accommodating the charge air cooler, to which section a third container section is connected that carries the air to the charge air cooler. A vertical crankshaft system including two crankshafts and horizontal cylinders is accommodated in the engine housing of the specially designed internal combustion engine. The exhaust gas turbocharger composed of a turbine and charger is disposed in a positionally optimized manner on the top front side of the engine housing. The first container section, second container section, and third container section are combined as one integrated piece composed of a light alloy to form an intake unit module that has highly effective properties in terms of strength and the transfer of radiated heat from the internal combustion engine. In addition, the third container section proves to be an excellent technical solution, which section is created as a tubular body that tapers down from the second container section toward the charger.

Another aspect to be emphasized is that, as viewed in a horizontal plane, the first and the second container sections of the intake tube unit, on the one hand connect at the inner side with a relatively small gap to the engine housing, and on the other hand run on the outer side adjacent to a protective cover of the outboard engine. This also enables the intake unit to be employed very effectively within restricted spatial conditions in excellent fashion, such as, e.g., the conditions of an outboard engine. Another contributing factor is that the charge air cooler has a cylindrical shape to which the second container section is fitted, wherein a depth dimension of the first cylinder section approximately matches the diameter of the charge air cooler as viewed in the horizontal plane.

Outstanding design approaches involve the fact that the connecting region of the tubular body is routed to the second container section and extends by a relatively large longitudinal dimension across an essentially vertical dimension of the referenced second container section, and additionally that the body covers an air supply chamber in front of the charge air cooler by means of an enveloping section.

What is exemplary first of all here is that the connecting section of the tubular body to the second container section has approximately the shape of an ellipse that transitions through a cross-sectional change in shape into a circular end region, as viewed across the length of the tubular body. Secondly, the end region of the tubular body is routed close to the output region of the charger of the exhaust gas turbocharger, an elastic sleeve functioning between the end region of the tubular body and the output region of the charger.

Finally, an excellent technical design is achieved by the fact that the second container section includes end regions in a form analogous to drilled holes adjacent to first and second end sections of the charge air cooler, into which regions the cylinder sections of the charge air cooler project. To this end, sealing elements are provided between the end regions and the cylinder sections. The end regions are provided with recesses to accommodate the sealing elements.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 depicts a section through the intake unit including an integrated charge air cooler;

FIG. 3 is a view indicated by the direction of arrow A in FIG. 2;

FIG. 4 is a detail X from FIG. 2 at an enlarged scale;

DETAILED DESCRIPTION OF THE DRAWINGS

Figure 1:
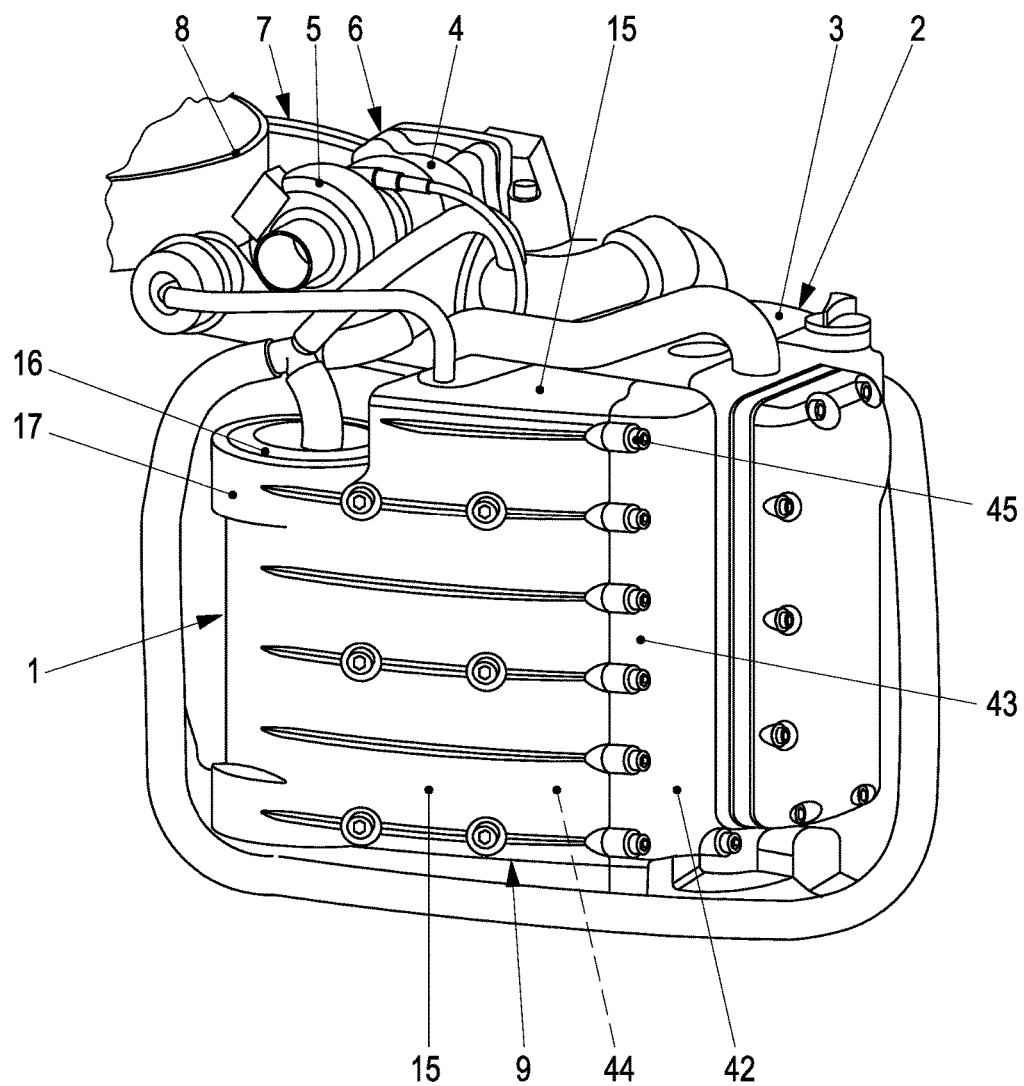
FIG. 1 is a schematic oblique view of an internal combustion engine functioning as an outboard engine, which engine includes an intake unit.

An internal combustion engine 1 is provided in the form of an outboard engine that functions as a boat propulsion means, as is described and depicted in above-referenced EP 2 696 054 A1. Internal combustion engine 1, which operates on the diesel principle using direct injection, is of a reciprocating piston design including, for example, two cylinders accommodating reciprocating pistons, which cylinders are part of an engine housing 2 that includes a cylinder housing and a cylinder head with inlet ducts. Two vertical crankshafts of a crankshaft system are supported within engine housing 2, one of the crankshafts interacting with a boat propeller whereby a gearing is interposed. The crankshafts are set into rotary motion through the mediating action of two connecting rods per reciprocating piston. An exhaust gas turbocharger 6 having a turbine 4 and a charger 5 is disposed on the top front side 3 of engine housing 2. In addition, free ends of the crankshafts are provided with flywheels 7 and 8—FIG. 1—above front side 3, the flywheels being vertically offset and partially overlapping each other.

An intake unit 9 is routed to the inlet ducts, not shown, of the cylinder head. The intake unit 9 includes connecting ducts 10, 11, 12, and 13 of a unit container 14. Unit container 14 is composed of a first container section 15, FIG. 2, that leads to the inlet channels of the cylinder head and includes connecting ducts 10, 11, 12, and 13, two per cylinder head since there are two inlet valves per cylinder head, a second container section 17 accommodating a charge air cooler 16, as well as a third container section 18 conducting the air to charge air cooler 16. Container sections 15, 17, and 18 are produced as one integrated piece, e.g., by a casting method, and combined to form one intake unit module 19. A material such as, e.g., a light alloy, is suitable for the referenced intake unit module 19. Third container section 18 runs in-between as a tubular body 20 that tapers down from second container section 17 toward charger 5.

First and second container sections 15 and 17 of intake unit 9 or of unit container 14, as viewed in a horizontal plane HE, connect on the one hand to an inner side 21 of engine housing 2 with a relatively small gap Ag. On the other hand, an outer side 22 of the intake unit runs adjacent to a protective cover 23 of the outboard engine or internal combustion engine 1. Part of charge air cooler 16 has a cylindrical shape to which second container section 17 is correspondingly fitted. Depth dimension Ti here, as viewed in horizontal plane HE, is approximately matched to one diameter Du of charge air cooler 16.

Figure 5:
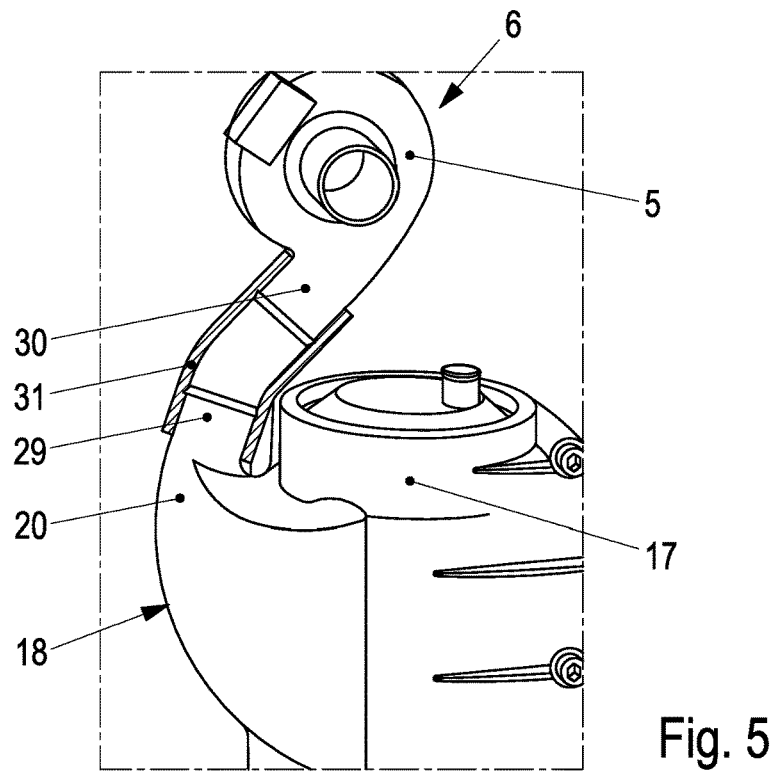
FIG. 5 depicts a connection between an end region of a tubular body of the intake unit and an outlet region of a charger of an exhaust gas turbocharger.
Figure 6:
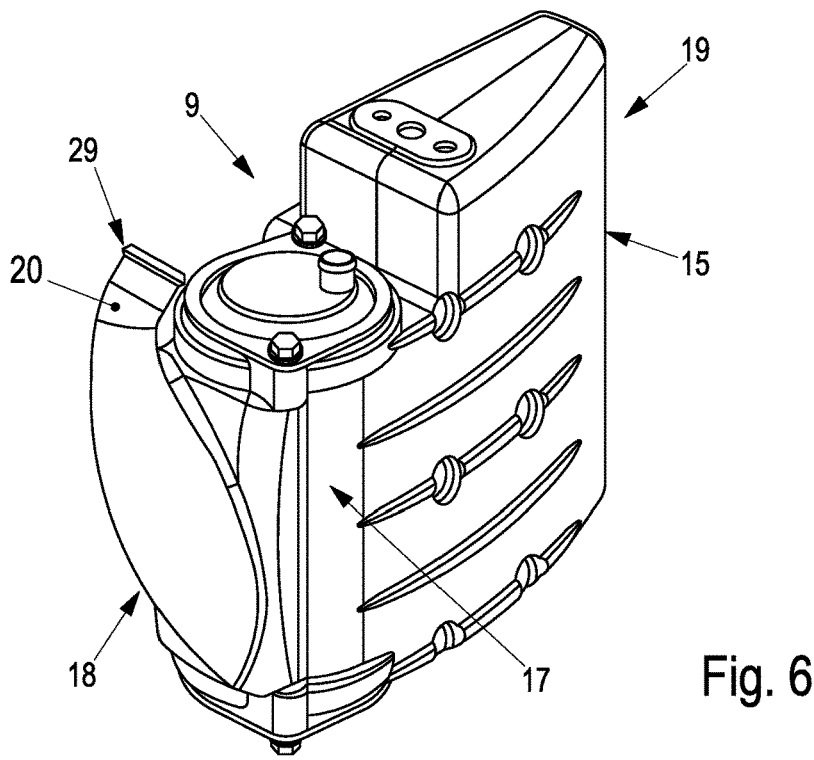
FIG. 6 is a perspective view of the intake unit in FIG. 1.

A connecting region 25 of tubular body 20 in the form of third container section 18 is routed to second container section 17, and thus connecting region 25 extends by a relatively large longitudinal dimension LI across essentially vertical dimension H of second container section 17. Tubular body 20 includes a convex enveloping section 26 so as to overarch air supply chamber 27 in front of charge air cooler 16. In addition, connecting region 25 of tubular body 20 on second container section 17 has approximately the shape of an ellipse 28—FIG. 3—that transitions through a longitudinal dimension LII of tubular body 20 by changing shape into a circular end region 29. End region 29 of tubular body 20 is routed close to an output region 30 of charger 5 of exhaust gas turbocharger 6. A sleeve 31—FIG. 5—composed, e.g., of an elastic material functions between end region 29 of tubular body 20 and output region 30 of charger 5.

Second container section 17 has end regions 34 and 35 analogous to drilled holes adjacent to first and second end sections 32 and 33 of charge air cooler 16. Cylindrical sections 36 and 37 of charge air cooler 16 project into these end regions. Sealing elements 38 and 39 are provided between end sections 32 and 33 of charge air cooler 16 and cylinder sections 36 and 37 of charge air cooler 16. End sections 32 and 33 in the embodiment are also provided with recesses 40 and 41 that are U-shaped in cross-section and secure sealing elements 38 and 39 in the axial direction.

Finally, a possible approach based on casting technology is to provide a cover 42—FIG. 1—on container section 15 of intake unit 9, which cover extends along a vertical boundary face 43 of first container section 15 and seals an interior space 44. Cover 42 is connected to first container section 15 by means of screws 45.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An outboard turbocharged internal combustion engine comprising:
    an outboard engine housing including a vertical crankshaft system and horizontal reciprocating piston cylinders with a cylinder housing and a cylinder head connected to inlet ducts;
    an exhaust gas turbocharger having a turbine and a charger disposed on a top front side of the outboard engine housing;
    an intake unit; and
    a charge air cooler integrated in the air intake unit and further including a cylindrical shape and a diameter;
        wherein the intake air unit is routed via connecting ducts and further including a unit container having first, second, and third container sections;
        wherein
            the first container section comprising the connecting ducts is connected to the second container section accommodating the charge air cooler;
            the second container section is connected to the third container section that carries air to the charge air cooler;
            the third container section is formed of a tubular body tapering downward from the second container section toward the charger of the exhaust gas turbocharger; and
                wherein the first container section, the second container section, and the third container section are combined as an integral unit forming an intake unit module composed of a light alloy.

2. The outboard turbocharged internal combustion engine according to claim 1:
    wherein the first and second container sections of the intake unit connect by an inner side with a relatively small gap to the outboard engine housing; and
    wherein the first and second container sections of the intake unit run by an outer side adjacent to a protective cover of the outboard engine.

3. The outboard turbocharged internal combustion engine according to claim 1:
    wherein the cylindrical shape of the charge air cooler is correspondingly fitted to the second container section; and
    wherein the diameter of the charge air cooler is matched to a depth dimension of the first container section.

4. The outboard turbocharged internal combustion engine according to claim 1, wherein the third container section of the unit container further including a connecting region of the tubular body connected to the second container section and extending by a relatively large longitudinal dimension across a vertical dimension of the second container section.

5. The outboard turbocharged internal combustion engine according to claim 1, wherein the tubular body of the third container section has an enveloping section so as to overarch an air supply chamber in front of the charge air cooler.

6. The outboard turbocharged internal combustion engine according to claim 1, wherein a connecting region of the tubular body to the second container section has approximately a shape of an ellipse that transitions through a longitudinal dimension of the tubular body by changing shape into a circular end region.

7. The outboard turbocharged internal combustion engine according to claim 1, wherein an end region of the tubular body is routed close to an output region of the charger of the exhaust gas turbocharger, and an elastic sleeve functions between the end region of the tubular body and the output region of the charger.

8. The outboard turbocharged internal combustion engine according to claim 1:
    wherein the second container section has end regions analogous to drilled holes adjacent to first and second end sections of the charge air cooler; and
    wherein cylinder sections of the charge air cooler project into the first and second end regions of the second container section.

9. The outboard turbocharged internal combustion engine according to claim 8, wherein sealing elements are provided between the first and second end regions of the second container section and the cylinder sections of the charge air cooler.

10. The outboard turbocharged internal combustion engine according to claim 9, wherein the first and second end sections of the second container section are provided with recesses to accommodate the sealing elements.

* * * * *